(No Model.)
L. WARD, S. A. SMITH & G. PASHLEY.
SHAKER FOR MIXING DRINKS.
No. 253,451. Patented Feb. 7, 1882.
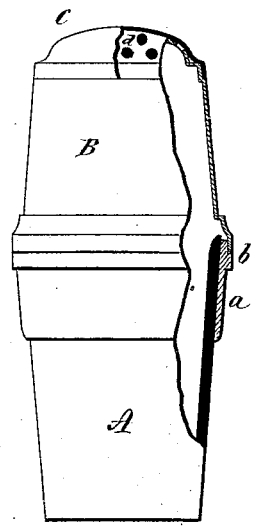
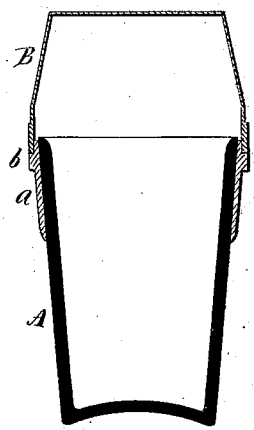

UNITED STATES PATENT OFFICE.

LEON WARD, SIDNEY A. SMITH, AND GEORGE PASHLEY, OF BRIDGEPORT, CONNECTICUT.

SHAKER FOR MIXING DRINKS.

SPECIFICATION forming part of Letters Patent No. 253,451, dated February 7, 1882.

Application filed October 21, 1881. (No model.)

*To all whom it may concern:*

Be it known that we, LEON WARD, SIDNEY A. SMITH, and GEORGE PASHLEY, of Bridgeport, in the county of Fairfield and State of Connecticut, have invented a new Improvement in Shakers for Mixing Drinks; and we do hereby declare the following, when taken in connection with the accompanying drawings and the letters of reference marked thereon, to be a full, clear, and exact description of the same, and which said drawings constitute part of this specification, and represent, in—

Figure 1, a sectional side view; Fig. 2, a vertical central section, showing modification.

This invention relates to an improvement in the utensil used for shaking mixed drinks, commonly called a "shaker." These are usually made from metal, and require that a tumbler shall be inserted bottom upward in the mouth of the shaker, so as to form a cover and practically a part of the shaker.

In the use of this class of shakers it is impossible for the person mixing the drink to use the shaker part as a measure for the parts to be mixed—that is to say, he cannot pour into the shaker and see through its walls so as to gage its contents; hence he is required to measure the different ingredients as he introduces them to the shaker. Again, the pieces of ice which are usually placed in the shaker, not only to cool the drink but to facilitate the mixing, frequently break the tumblers which are used to close the mouth of the shaker.

The object of this invention is to construct a shaker in which these difficulties will be overcome; and it consists in a glass, (or similar material) receptacle provided with a metal neck, combined with a metal cup fitted to set into said neck and readily removable therefrom, as more fully hereinafter described.

A represents the body of the shaker, of glass or some equivalent material, around the top of which is a metal neck, $a$, securely attached to the side of the body. B is the cup, which is also made of metal and so as to set firmly onto the body of the metal neck and close upon a shoulder, $b$, thereon, as seen in Figs. 1 and 2, so as to make a tight joint.

The mixer uses the body A of the shaker as he would a tumbler, readily gaging the contents which he places therein as he would in a tumbler, because it is transparent, and having introduced the requisite material, he places the metallic cup B over the mouth of the body and then proceeds in the usual manner, the cup B serving the same purpose as the tumbler usually employed for this purpose in enabling him to draw off the liquid portion of the contents and retain the ice and other parts in the shaker.

If preferred, the cup B may have its closed end perforated, as at $d$, Fig. 1, and then the cap C set over the perforated end, fitting closely and so as to close the perforations, as seen in Fig. 1. Then when the contents have been properly shaken the cap C may be removed and the cup used as a strainer, in like manner to the detached strainer now commonly used.

The metal neck $a$ protects the edge of the glass from breakage, and the shaker as a whole is neater, because more readily cleansed than metal, more durable, because it is not liable to be bent out of shape, as is the metal shaker, and more convenient, because the parts perfectly fit together and are adapted to each other—a condition impossible in a common shaker with common tumblers.

We are aware that liquor-mixers consisting of two cups, the one so as to closely engage the other, have heretofore been used, and therefore do not broadly claim such a device; but we are not aware that a mixer consisting of a glass body provided with a metal neck made a permanent part of it, combined with a metal cap constructed to fit upon the metal neck of the body, has been used prior to our invention.

We claim—

1. The herein-described shaker for mixing drinks, consisting of the glass body A, provided with the metal neck $a$, combined with a metal cup constructed to fit upon said neck and close the mouth of the body, substantially as described.

2. The herein-described shaker for mixing drinks, consisting of the glass body A, provided with the metal neck $a$, combined with a metal cup constructed to fit upon said neck and close the mouth of the body, the said cup perforated at its closed end, and with the cap C, substantially as described.

LEON WARD.
SIDNEY A. SMITH.
GEORGE PASHLEY.

Witnesses:
ALFRED B. BEERS,
DAVID B. LOCKWOOD.